United States Patent [19]
Pautrat et al.

[11] 3,957,737
[45] May 18, 1976

[54] METHOD FOR THE PREPARATION OF RUBBERS WITH LOW MOLECULAR WEIGHTS THROUGH DEGRADATION OF MACROMOLECULAR POLYENES, AND THE PRODUCTS THUS OBTAINED

[75] Inventors: Rene Pautrat, Le Mans; Jacques Marteau, Paris, both of France

[73] Assignee: Anvar, Agence Nationale de Valorisation de la Recherche, Neuilly-sur-Seine, France

[22] Filed: Jan. 24, 1975

[21] Appl. No.: 543,781

[30] Foreign Application Priority Data
Jan. 30, 1974  France .............................. 74.03052

[52] U.S. Cl. .................... 260/79.3 R; 260/79.5 NV;
260/96 D; 260/879; 260/769; 260/773;
526/213; 526/217; 526/222; 526/227;
526/914; 526/915
[51] Int. Cl.² .................... C08C 19/08; C08C 19/20
[58] Field of Search .................. 260/94.7 D, 94.7 N, 260/94.7 A, 79.3 R, 79.5 NV, 96 D, 92.3, 769, 773, 879; 450/621, 615, 623.5, 609

[56] References Cited
UNITED STATES PATENTS

| | | | |
|---|---|---|---|
| 2,770,603 | 11/1956 | Lynch ............................ | 260/94.7 X |
| 3,062,802 | 11/1962 | Cunneen et al .................... | 260/94.7 |
| 3,790,549 | 2/1974 | Feniak ............................ | 260/94.7 X |

*Primary Examiner*—William F. Hamrock

[57] ABSTRACT

An unsaturated hydrocarbon elastomer with a high molecular weight is reacted upon an oxidizer and a reducer forming a redox couple, in an organic solvent medium in the absence of air or in an aqueous medium, the oxidizer being selected from the group consisting of hydrogen peroxide and organic peroxides, and the reducer being selected from the group consisting of sulphinic acids and their derivatives and of hydrazine and its derivatives.

The pasty to liquid materials obtained give, after having been vulcanized and possibly reinforced, elastomeric products.

18 Claims, 1 Drawing Figure

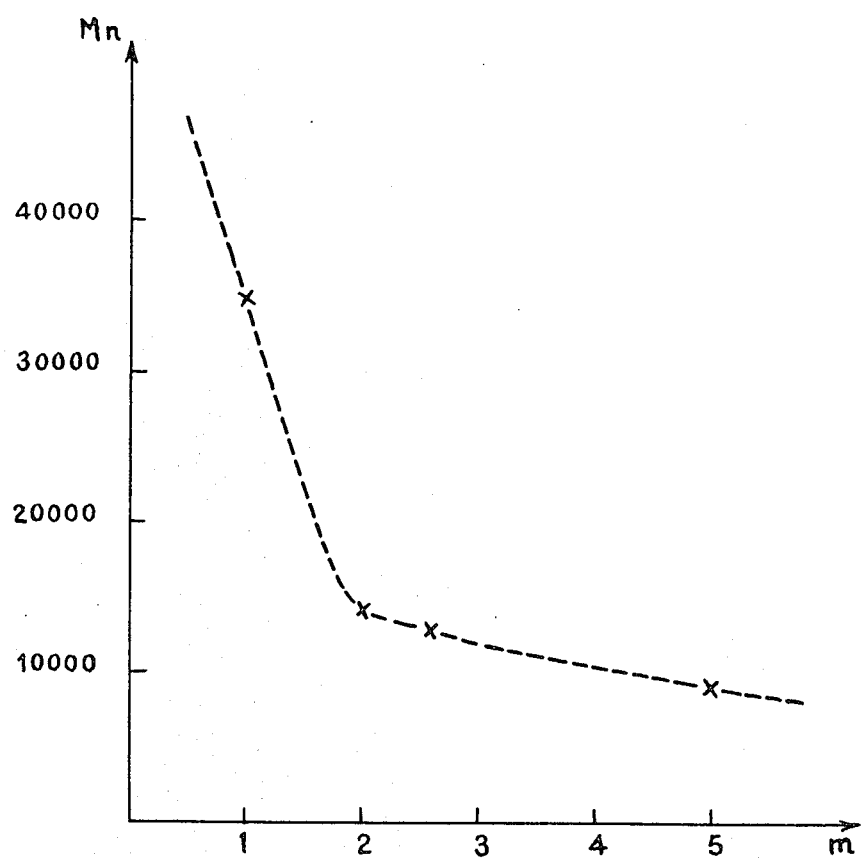

METHOD FOR THE PREPARATION OF RUBBERS WITH LOW MOLECULAR WEIGHTS THROUGH DEGRADATION OF MACROMOLECULAR POLYENES, AND THE PRODUCTS THUS OBTAINED

BACKGROUND OF THE INVENTION

This invention relates to the preparation of rubbery polymers with low molecular weights by a controlled degradation reaction applied to unsaturated hydrocarbon elastomers. It covers a novel method and the novel products obtained at the various stages of their manufacture.

Many attempts have been made to simplify the processing of natural and synthetic rubbers, which resorts to masticating, mixing, and high-temperature and high-pressure moulding methods. Such operations heavily burden the cost of manufactured articles. To avoid the use of such costly equipment as masticating mills and vulcanizing presses, attempts have therefore been made to use rubbers under a fluidified form, notably as a dispersion in water, known as a latex. Until now, the direct use of latex has remained limited. The difficulties encountered when reinforcing the material, as well as the uncertain dimensions of parts, due to shrinking owing to difficult elimination of water, explain that such methods have not been used industrially, e.g. for the manufacture of tyres. It seemed therefore suitable to use, instead of a latex, a material having a fluidity, that would be ascribable not to the presence of a foreign liquid phase, but to an intrinsic property, directly resulting from its low degree of polymerization. Indeed, a large amount of research work on the preparation of such liquid elastomers is being actively carried out all over the world since many years. The method used is mostly radical or anionic polymerization of monomers such as butadiene, styrene etc. The literature contains many patents and papers on the subject.

However, another way leads to oligomers with low molecular weights: this makes use of controlled depolymerization of hydrocarbon macromolecules. Historically speaking, this was the method which lay behind the coming out on the market in 1923 of the first liquid rubbers (D.P.R., manufactured by Hardman). Since then, various attempts have been made using thermal or mechanical energy or the action of some chemical peptizers (Farbenfabriken Bayer, B.P. 693 331, 24 June 1953), but they have not led to oligomers which can be used in casting, transfer or injection methods. Recently, however, a low molecular weight polybutadiene with carboxyl end groups has been obtained by ozonolysis of a stereo-regular poly-1,4-cis-butadiene (D.P. Stephens, R.C. McIntosh and O. Taylor J. Polymer Sci. A-1, Vol. 6 (1968), p. 1037).

SUMMARY OF THE INVENTION

One of the main advantages of this invention is that it makes it possible to prepare oligomers with well-defined and regular steric structures, unlike what usually occurs when short diene chains are obtained by polymerization. Now it is well known that high steric regularity makes for good strength properties. Another important advantage is that the chain length of the oligomers can readily be controlled by altering the proportions of the reagents, which is far more difficult with polymerization methods.

This invention is based on the observation that a suitably balanced mixture of two substances with respectively oxidizing and reducing properties (redox couple) can, under certain conditions, cut polymer chains, with incidental fixing on the oligomers thus formed of chemical groups from the redox couple or from the reaction medium. When the degradation (or depolymerization) is to be very low, the materials are maintained as elasto-plastic masses (low-viscosity rubbers as pastes) which can be used in the same fields as conventional rubbers (adhesives, shock absorption). By suitable treatment, such materials (with number molecular weights Mn from about 50,000 to about 100,000) can be made dispersable in aqueous media, which opens new fields of application (mechanical and chemical stabilization of soils, additives for the conveyance of fluids through pipes etc.). When the degradation (or depolymerization) is to be higher, semi-liquid or liquid materials are obtained which can be used for casting or low-pressure moulding, and which, after having been vulcanized and incidentally reinforced, give materials having the properties of elastomers (elongation at break above 100%, breaking strength above 100 kilograms/cubic centimeter), with a considerable saving of mechanical and thermal energy with respect to the conventional methods of processing rubbers, which is the primary object aimed at and a major industrial advantage.

This degradation method applies to many unsaturated hydrocarbon polymers, but is especially effective on elastomers, notably on natural and synthetic polyisoprenes, which are one of the major classes of elastomers. The method applies to solutions of rubbers in organic solvents or to aqueous dispersions of elastomers known as latex: in the first instance, it should be carried out in the absence of air, for instance under nitrogen.

The principle of the invention rests upon the action of a redox couple upon an unsaturated elastomer, such as a polyisoprene. The oxidizer is usually hydrogen peroxide or an organic peroxide. The reducer is usually a sulphinic acid or a derivative thereof, or else a hydrazine or a derivative thereof. As regards the molecular weight of the oligomer, the result depends upon the molar proportions of the components in the reactive combination. The numerical molecular weight Mn can vary between 100,000 and 5,000, according to the oxidizer/reducer molar ratio, which lies preferably between 0.5 and 6, and according to the ratio between the reducer and the elastomer, which can vary from 100 millimoles to 1 millimole of reducer per 100 grams of elastomer. Still more preferably, the oxidizer/reducer molar ratio lies between 2 and 5 the reducer proportion is from 80 to 5 millimoles per 100 grams of elastomer.

As will be shown hereafter, neither the oxidizer alone nor the reducer alone leads to the desired result, under acceptable experimental conditions, i.e. preferably below the boiling point of the reaction medium and therefore under atmospheric pressure; besides, the degraded products obtained do not have the required quantity. A redox couple must be used if the reaction conditions are to be practical and economical, and if the oligomers obtained are to have a well-defined and regular steric structure.

The degradation method described in this patent requires reaction temperatures between room temperature and 250°C, according to the solvent used, but preferably between 60°C and 150°60C. Rubber solutions in an organic solvent are used, with an elastomer concentration between 1% and 10% by weight. The organic solvent preferably belongs to the hydrocarbon class (aliphatic, cycloaliphatic or aromatic hydrocarbons such as heptane, cyclohexane, benzene, toluene, decalin). Chlorinated solvents, such as chloroform, carbon tetrachloride, trichlorethylene, may also be used, but more sometimes partly decomposed by the redox couple, with simultaneous fixation of a number of chlorine atoms upon the treated polymer. In the case of reactions on a latex, the rubber concentrations in the water dispersion lie between 10% and % by weight. When the reaction is at an end, collected depolymerized rubber is purified either by extraction of residues or excess reagent, or by a series of dissolutions and reprecipitations by means of a solvent/non-solvent couple. The approximate average molecular weight is measured by viscosimetry and the chemical composition is determined by elementary and functional organic analysis. The micro-structure is established by infrared spectrophotometric and nuclear magnetic resonance measurements.

An oxidation catalyst (metal salt of ethylendiaminetetraacetic acid) is used with advantage: it increases the activity of the redox couple and therefore enhances degradation. The proportion of this catalyst varies from 0.5% to 3% by weight of the elastomer used.

The products obtained can be vulcanized either by conventional systems used in the rubber industry (sulphur + accelerators, peroxides), or by specific reagents for the chemical functions on or at the end of the oligomer chains (e.g. polyisocyanates in the case of hydroxylated oligomers, polyamines in the case of halogenated oligomers). Vulcanizing temperatures obviously depend on the cross-linking system used: they lie between room temperature and 220°C. The moulding pressures used are much lower than for elastomers with high molecular weights, and do not exceed a few kilograms/cubic centimeter with transfer methods. In the case of casting techniques, light moulds with low strengths may be used.

The liquid rubbers described in this invention may be reinforced during or after the vulcanizing process by means of conventional fillers used in the rubber industry: carbon blacks, silicates (of the types silicas, china clays, micas) etc. The fillers are preferably incorporated into the rubber in masticating mills or internal mixers with low energy demands, owing to the low viscosity of the media. In a variation of the method, the incorporation of the fillers is made easier and the qualities of the finished material is improved e.g. by use of surface-treated silicas.

Another claim is the obtainment of self-reinforced elastomers by chemical combination of the liquid rubbers obtained by the above-mentioned method with rigid polymers such as polyacrylonitrile, polystyrene, poly-α-methylstyrene, polyacrylates or polymethacrylates. Chemical combination is induced by mixing the monomers corresponding to the abovementioned resins with the liquid rubbers, and by heating the mixture with a suitable grafting and polymerizing catalyst (peroxide-type radical catalyst, organometallic catalyst for anionic grafting). The final product has such rigidity and strength that the incorporation of reinforcing fillers can be omitted.

Description of the Preferred Embodiments

The following non-limitative examples illustrate the invention and define the procedures and experimentals details required for carrying out the method. All molecular weights are given as numerical averages Mn, computed from intrinsic viscosities.

EXAMPLE 1

In a glass reactor fitted out with a powerful stirrer, a reflux condenser, a nitrogen inlet and a dropping funnel, 50 g natural rubber (smoked sheet) were dissolved in 1 liter toluene (under nitrogen to avoid oxidation reactions). The solution was then heated to 100°C. 3.5 g tolueneparasulphinic acid ($CH_3$-$C_6H_4$-$SO_2H$, manufactured by Merck) with about 10% water, i.e. 0.02 mole, were then added in one portion. The solution rapidly became fluid. 3.65 ml hydrogen peroxide ($H_2O_2$, 130 volumes), manufactured by the French company Prolabo), i.e. 0.04 mole, were then added. The oxidizer/reducer ratio $m$ was therefore 2. The solution became yellow, then darkened progressively. The treatment was continued under a weak current of nitrogen for seven hours at 100°C.

The solution was then cooled and poured into an excess of technical ethanol or methanol (non-solvent of degraded rubber): an oily layer slowly formed at the bottom of the flask and was recovered by decantation. The product was purified by dissolution in toluene and reprecipitating with alcohol. It was then dried at 50°C in an oven under vacuum. Chemical analysis of the purified material showed 1.7% oxygen content and 0.5% sulphur content. The intrinsic viscosity of a toluene solution of the oligomer was found to be $[\eta] = 31$ ml/g, which corresponds to an approximate molecular weight of 14,000. For purposes of comparison, the intrinsic viscosity in toluene was measured for a natural rubber which had undergone the same heating and purifying treatments as in Example 1, but with no redox couple. The result was $[\eta] = 255$ ml/g, which corresponds to a molecular weight well over 200,000. As to the microstructure of the polymer chains, infrared spectrophotometry showed that the 1,4-cis structure which prevailed in the initial high molecular weight polyisoprene was preserved in the oligomer formed, and that no isomerizing or ring closing side reactions occurred during the treatment. A strong absorption at 1720 $cm^{-1}$, which is not found with the initial rubber, corresponds to oxygenated groups.

EXAMPLE 2

The procedure was the same, but with different values of $m$, the hydrogen peroxide/tolueneparasulphinic acid molecular ratio. The following table and the appended curve show the results obtained and the influence of the amount of $H_2O_2$ on the degradation process, i.e. on the molecular weight Mn. The molar amounts shown correspond to 2,500 g polyisoprene.

| | | Reaction condition | | | |
|---|---|---|---|---|---|
| $H_2O_2$ (moles) | Tolueneparasulphinic acid (moles) | Temperature (°C) | Time (hrs) | $[\eta]$ (ml/g) | Mn (average) |
| 1.0 | 1 | 100 | 7 | 57 | 35,000 |
| 2.0 | 1 | 100 | 7 | 31 | 14,000 |
| 2.6 | 1 | 100 | 7 | 28 | 13,000 |

-continued

| $H_2O_2$ (moles) | Toluenepara-sulphinic acid (moles) | Reaction condition Temperature (°C) | Time (hrs) | $[\eta]$ (ml/g) | Mn (average) |
|---|---|---|---|---|---|
| 5.2 | 1 | 100 | 7 | 22 | 9,000 |

Under the same conditions, but with tolueneparasulphinic acid alone (without $H_2O_2$), a cyclic rubber with no useful properties was obtained. With hydrogen peroxide alone (without tolueneparasulphinic acid), the rubber was not depolymerized at 100°C. Heating at 150°C for three hours was necessary to obtain depolymerization in toluene with concomitant fixation of OH groups. The molecular weight of the product was approximately 10,500, which corresponds to 24.5 ml/g intrinsic viscosity. At these high temperatures, above the boiling point of the solvent (i.e. toluene), one has to use an autoclave which resists both the pressure and the corroding action of hydrogen peroxide.

EXAMPLE 3

The procedure was the same as in Example 1, but with a synthetic polyisoprene with a high amount (98%) of 1,4-cis groups (Natsyn 2200, manufactured by the U.S. Company Goodyear). 50 g synthetic polyisoprene were dissolved in 1 liter toluene; 3.5 g tolueneparasulphinic acid (0.02 mole) and 3.64 ml of 130-volume $H_2O_2$ (0.04 mole) were added ($m = 2$). The reaction as effected under nitrogen at 100°C for seven hours. After purifying and drying, the depolymerized rubber obtained had the following properties:

O, 2.18% S, 0.38% $[\eta] = 28.1$ ml/g Mn = 13,000
(The intrinsic viscosity of the initial polyisoprene was 410 mg/l.)

EXAMPLE 4

The procedure was the same, but with synthetic elastomers with different chemical compositions and structures: a polybutadiene with a high amount (96%) of 1.4-cis groups (Cariflex BR 1220, manufactured by Shell France), and a polychloroprene with a high amount of 1,4-trans groups (Neoprene W, manufactured by Du Pont de Nemours). The intrinsic viscosities of the polymers in toluene before the reaction were:

1,4-cis polybutadiene: $[\eta] = 189$ ml/g
1,4-trans polychloroprene: $[\eta] = 92$ ml/g 100 g synthetic elastomer were dissolved in 2 liters toluene, then treated at 100°C for seven hours (under nitrogen) with 6.2 g tolueneparasulphinic acid (0.04 mole) and 11 ml 130-volume hydrogen peroxide (0.12 mole). The molar ratio was therefore $m = 3$. After purifying and drying, partly depolymerized products were obtained, with the following properties:

Treated polybutadiene: O, 2.30% S, 1.05% $[\eta] = 82$ ml/g
Treated polychloroprene: O, 2.02% S, 0% $[\eta] = 38$ ml/g

EXAMPLE 5

The procedure was the same as in Example 1, but with 2,4-dichlorobenzoyl peroxide (manufactured by Societe Chalonnaise des Peroxydes Organiques, France) instead of hydrogen peroxide.

50 g natural polyisoprene were dissolved in 1 liter toluene. The solution was heated at 80°C, and 3.10 g anhydrous recrystalized toluene-parasulphinic acid (0.02 mole) and 150 ml 10% commercial peroxide in toluene were added, in that order. Commercial 2,4-dichlorobenzoyl peroxide is sold as a 50% dispersion of active substance in a phtalate. Allowing for the dilution, the amount of oxidizer in the medium was 7.5 g (0.02 mole, $m = 1$). The reaction continued for seven hours at 80°C under nitrogen. After purifying and drying, a fluid product was obtained which had the following properties:

O, 4.48% Cl, 1.9% $[\eta] = 35.5$ ml/g

The approximate molecular weight, computed from the intrinsic viscosity, was 17,000.

EXAMPLE 6

This example relates to the action of the tolueneparasulphinic acid-hydrogen peroxide couple on a latex of natural rubber.

To 200 ml latex containing 120 g rubber, 20 ml of a 15% water solution of Mergital (a stabilizer manufactured by Sinnova, France, were added. The mixture was left standing overnight, then introduced into a reactor equipped with stirrer, which was placed in a thermostatic bath at 80°C. 17 g tolueneparasulphinic acid containing about 10% water (0.1 mole), then 18 ml 130-volume hydrogen peroxide (0.2 mole) were added. After stirring for about 30 minutes, microflocculation occurred, then the medium became homogeneous again. Stirring was stopped after four hours, and 500 ml methylated spirit were added. After decanting, a highly plastic white mass was obtained, which, after purifying and drying, had the following properties:

O, 4.95% S, 0.8% $[\eta] = 51$ ml/g

The approximate molecular weight was 30,000. In this instance tolueneparasulphinic acid may be replaced by the equivalent amount of its sodium salt. The latter is prepared according to the procedure described in A.I. Vogel, A text-book of practical organic chemistry, Longmans Ed. 1959, p. 826. The reaction medium is then slightly acidified by adding sulphuric acid to the latex.

EXAMPLE 7

The procedure and amounts of reactants were the same as in the foregoing example, but to the redox couple was added a small amount of a water-soluble organo-metallic compound which played the part of an oxidation catalyst, viz. a copper, iron, manganese, cobalt etc. salt of ethylenediaminetetraacetic acid (Masquolates, manufactured by Protex, France). These salts enhance the degrading action of the redox couple, all things being otherwise equal.

For instance, to 200 ml latex (with 60% dry rubber) were added 1.2 g copper masquolate, then 17 g tolueneparasulphinic acid and 18 ml 130-volume hydrogen peroxide. After 5 hours' heating and stirring at 80°C, the product had an intrinsic viscosity of 23.3 ml/g, which corresponded to an approximate molecular weight of 10,000. The presence of the copper salt, playing the part of an oxidation catalyst with the redox couple, makes it therefore possible to obtain highly fluid products, readily used for casting.

EXAMPLE 8

The procedure was the same as in Example 6, but with monophenylhydrazine (manufactured by Prolabo) instead of tolueneparasulphinic acid as a reducer.

200 ml latex were stabilized with Mergital as above 2.5 g technical monophenylhydrazine, then 3.4 ml 130-volume hydrogen peroxide were added. The mixture was allowed to react under stirring at 60°C for 24 hours. After purifying and vacuum drying, a low-viscosity product was obtained, which flowed readily and had the following properties:

C, 85.64% H, 10.84 O, 2.17% N, 0.30% [$\eta$] = 32.5 ml/g

The approximate molecular weight was therefore 14,000.

EXAMPLE 9

One of the materials described in Example 2, with a molecular weight of about 9,000–10,000, was used. In an internal masticating mill (kneading-trough type), or in any other mixing system adapted to the fluidity of the medium, 100 g depolymerized rubber and 12.2 ml commercial triisocyanato-triphenylmethane $HC(C_6H_4NCO)_3$ (Desmodur R, manufactured by Bayer, Germany, as a 20% solution in methylene chloride, i.e. 4.88 g pure triisocyanate, were introduced. The methylene chloride was then evaporated, and the air included in the mixture was expelled by evacuating the atmosphere above the mixture with a pump down to a residual pressure of about 1 mm Hg. The mixture was then cast into a mould, without external pressure, and heated in a first stage to 70°C (2 hrs. 30 mins) and in a second stage to 100°C (3 hrs). An elastic vulcanizate was obtained. In this instance, crosslinking was due to the reaction of oxygenated functional groups in the liquid polymer upon the isocyanate groups of Desmodur R. A control polyisoprene with a high molecular weight, treated with the same triisocyanate, gave no vulcanizate.

EXAMPLE 10

This example relates to the cross-linking of products described in this invention by means of a vulcanizing systems conventionally used with high molecular weight elastomers.

In a masticating mill, 100 g rubber with a molecular weight between 15,000 and 20,000, obtained according to the present depolymerizing method, were mixed with 2 g pure dicumyl peroxide (manufactured by Nourylande, France). The mixture was heated to 160°C for 10 minutes to give an elastic vulcanizate, much less brittle than the equivalent products derived from high molecular weight rubbers.

EXAMPLE 11

The procedure was the same as in the foregoing example, but the peroxide was replaced by a sulphur-containing system:

| | |
|---|---|
| Depolymerized rubber | 100 g |
| Stearic acid | 3 g |
| Zinc oxide | 5 g |
| Phenolic antioxygen | 1 g |
| Aminated antioxygen | 1 g |
| Sulphur | 2.5 g |
| Accelerator (Santocure, manufactured by British Monsanto) | 0.8 g |

Vulcanization was obtained through heating at 143°C for 20 minutes.

EXAMPLE 12

This example relates to the preparation of reinforced rubbers by combining the liquid or semi-liquid rubbers of the invention with rigid resins or resins with high vitreous transition points. Polymerization, grafting of the resin onto the rubber and cross-linking of the rubber by means of a peroxide were effected simultaneously.

| The following mixture was prepared: | |
|---|---|
| Depolymerized rubber | 100 g |
| Trimethylolpropane triacrylate (SR 351, manufactured by Sartomer, U.S.A.) | 20 g |
| Dicumyl peroxide | 2.5 g |

In this instance, dicumyl peroxide acted simultaneously as a catalyst for the polymerization and the grafting of the resin and as a vulcanizer.

The mixture was then placed in a transfer mould or an ordinary mould, and heated to 150°C for 30 minutes. The result was a light-coloured rigid plate having the main properties of a reinforced rubber vulcanizate.

EXAMPLE 13

The procedure was the same as in the previous example, but polymerization and grafting of the resin were done independently from the vulcanization of the rubber, i.e. both chemical reactions were distinct, even when occurring simultaneously. A conventional sulphur-containing system was used for vulcanizing.

| The following mixture was prepared: | |
|---|---|
| Depolymerized rubber | 100 g |
| Trimethylolpropane triacrylate | 10 g |
| Cumene hydroperoxide | 3 g |
| Stearic acid | 3 g |
| Zinc oxide | 5 g |
| Sulphur | 1 g |
| Accelerator | 0.5 g |
| 30 mins. heating at 120°C. | |

Trimethylolpropane triacrylate was the polymerizing and grafting agent, and cumene hydroperoxide was the polymerizing and grafting catalyst.

The vulcanizate obtained was less rigid and more elastic than in the previous example.

What is claimed as new is:

1. A method of preparing low molecular weight rubbers with pasty to semi-liquid or liquid consistencies through degradation of macromolecular polyenes, comprising reacting an unsaturated hydrocarbon elastomer with a high molecular weight upon an oxidizer and a reducer forming a redox couple, the molar ratio between the oxidizer and the reducer lying between 0.5 and 6, in a organic solvent medium containing 1% to 10% by weight of the said elastomer and in the absence of air, or in an aqueous medium containing 10% to 60% by weight of the said elastomer, the oxidizer being selected from the group consisting of hydrogen peroxide and organic peroxides, and the reducer being selected from the group consisting of sulphinic acids and their derivatives and of hydrazine and its derivatives, at a temperature lying between room temperature and 250°C, the proportion of the reducer being of 100 millimoles to 1 millimole per 100 g of said elastomer.

2. A method according to claim 1, wherein the reaction temperature lies between 60° and 150°C.

3. A method according to claim 1 wherein the reaction is effected under atmospheric pressure, at a temperature below the boiling point of the said medium.

4. A method according to claim 1 wherein a metal salt of ethylenediaminetetraacetic acid is used as an oxidation catalyst, in the proportion of 0.5 to 3% by weight on the basis of said elastomer.

5. A method according to claim 1 wherein the depolymerized rubber obtained is purified by a series of dissolutions and reprecipitations by means of a solvent/nonsolvent couple.

6. A method according to claim 1 wherein the produced depolymerized rubber is vulcanized.

7. A method according to claim 1 wherein the produced depolymerized rubber is reinforced and vulcanized.

8. A method according to claim 1 wherein said elastomer used as the starting material is selected from the group consisting of natural and synthetic polyisoprenes, polybutadienes and polychloroprenes.

9. A method according to claim 8 wherein the reaction temperature lies between 60°C and 150°C.

10. A method according to claim 9 wherein a metal salt of ethylenediaminetetraacetic acid is used as an oxidation catalyst, in the proportion of 0.5 to 3% by weight on the basis of said elastomer.

11. A method according to claim 9 wherein the depolymerized rubber obtained is purified by a series of dissolutions and reprecipitations by means of a solvent/non-solvent couple.

12. A method according to claim 11 wherein the depolymerized rubber produced is vulcanized.

13. A method according to claim 11 wherein the depolymerized rubber produced is reinforced and vulcanized.

14. A method according to claim 1 wherein the molar ratio between the oxidizer and the reducer is in the range of 2 to 5 and the proportion of the reducer is in the range of 80 millimoles to 5 millimoles per 100 g of said elastomer.

15. Rubbers with low numerical molecular weights, lying between 5,000 and 100,000, with pasty to semi-liquid or liquid consistencies, produced by the method according to claim 1.

16. Rubbers with low numerical molecular weights, lying between 5,000 and 100,000, vulcanized, produced by the method according to claim 6.

17. Rubbers with low numerical molecular weights, lying between 5,000 and 100,000 reinforced and vulcanized, produced by the method according to claim 7.

18. A method of preparing low molecular weight rubbers with pasty to semi-liquid or liquid consistencies through degradation of macromolecular polyenes, comprising reacting an unsaturated hydrocarbon elastomer with a high molecular weight upon an oxidizer and a reducer forming a redox couple, the molar ratio between the oxidizer and the reducer lying between 0.5 and 6, in an organic solvent medium containing 1% to 10% by weight of the said elastomer and in the absence of air, or in an aqueous medium containing 10% to 60% by weight of the said elastomer, the oxidizer being selected from the group consisting of hydrogen peroxide and organic peroxides, and the reducer being a sulphinic acid compound, at a temperature lying between room temperature and 250°C, the proportion of the reducer being of 100 millimoles to 1 millimoles per 100 g of said elastomer.

* * * * *